United States Patent [19]

Shimizu

[11] Patent Number: 4,653,391
[45] Date of Patent: Mar. 31, 1987

[54] APPARATUS FOR FRYING FOODS
[75] Inventor: Yasuhiro Shimizu, Isehara, Japan
[73] Assignee: Toshin Technical Co., Ltd., Japan
[21] Appl. No.: 900,234
[22] Filed: Aug. 25, 1986

Related U.S. Application Data

[63] Continuation of Ser. No. 542,240, Oct. 14, 1983, abandoned.

[30] Foreign Application Priority Data

Oct. 16, 1982 [JP] Japan ............................. 57-180577

[51] Int. Cl.⁴ ............................................. A47J 37/10
[52] U.S. Cl. ....................................... 99/349; 99/422; 99/424; 126/390; 426/568
[58] Field of Search ................. 99/422, 423, 424, 425, 99/349, 397; 164/79, 119; 126/390; 426/568

[56] References Cited

U.S. PATENT DOCUMENTS

| | | |
|---|---|---|
| 264,867 | 9/1882 | Ege . |
| 1,216,973 | 2/1917 | Epprecht . |
| 2,618,258 | 11/1952 | Kroyer . |
| 2,765,728 | 10/1956 | Pearce ............................. 126/390 X |
| 3,007,595 | 11/1961 | Remley . |
| 3,236,706 | 2/1966 | Kuchek ............................. 164/79 X |
| 3,333,955 | 8/1967 | Walker ............................. 99/422 X |
| 4,076,070 | 2/1978 | Lefebure ............................. 164/119 |

FOREIGN PATENT DOCUMENTS 1511407  5/1978  United Kingdom ................. 99/422

*Primary Examiner*—Billy J. Wilhite
*Attorney, Agent, or Firm*—Guy W. Shoup

[57]  ABSTRACT

A frying device for foods comprises a metallic frying member, cast from an aluminum alloy, with a plurality of oil-filled pores and cavities of specified defined size which act to prevent the food being fried in the device from sticking to the metal frying member. The walls of the frying device are provided with a plurality of openings to enable cooking gases to escape. Less than 50% of the surface oil as is used in conventional roasting devices is required in my device.

The device and method are particularly adapted for the production of multilayered food products, where a plurality of layers of a product are automatically laid down in timed sequence within the roasting device.

2 Claims, 8 Drawing Figures

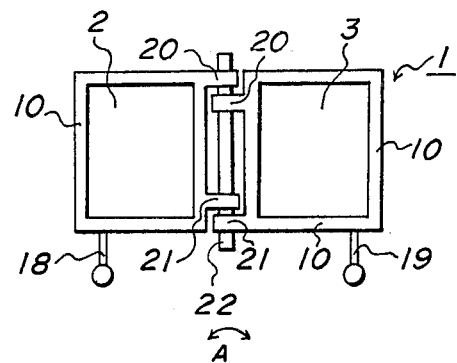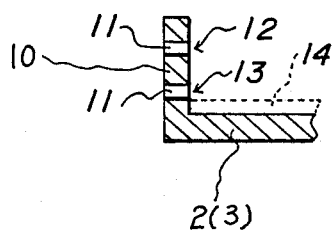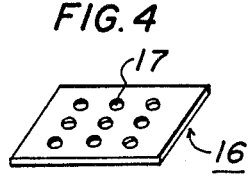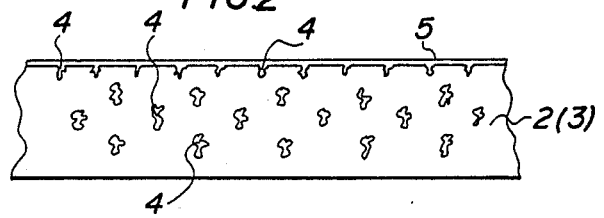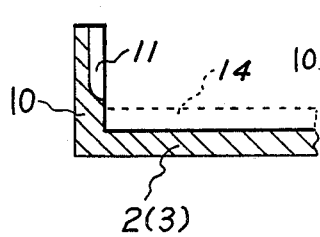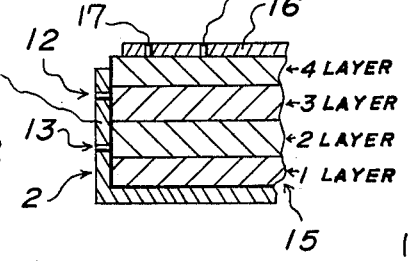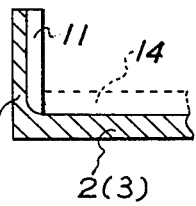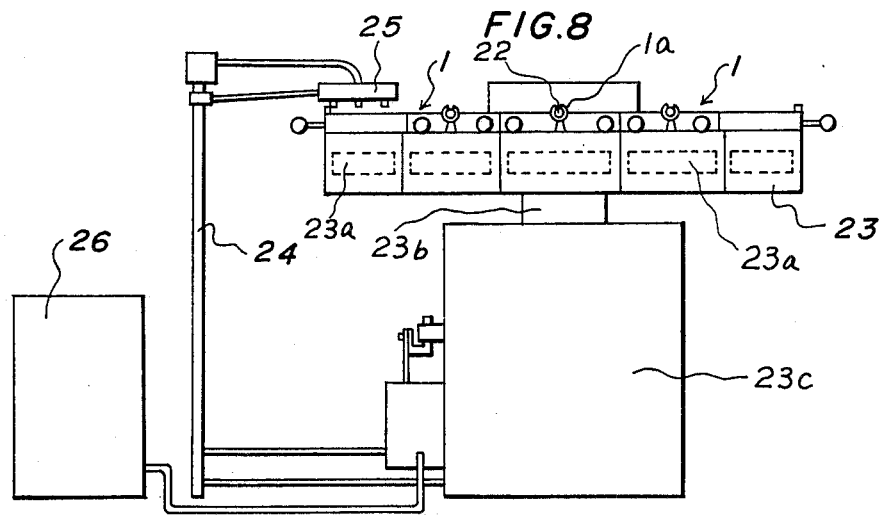

APPARATUS FOR FRYING FOODS

This is a continuation from application Ser. No. 542,240 filed Oct. 14, 1983 now abandoned.

BACKGROUND OF THE INVENTION

1. Field of the Invention

Fried foods, for example, omelets, are widely prepared. Always present are the problems of food sticking to the frying surface and the venting of cooking gases in a closed system. In moving the food frying process from the home kitchen into the commercial and institutional large scale kitchen, there is the further need for structure that will withstand constant and intensive use. A material component of any frying system is the device in which the food is fried, and that device must be capable of intensive and sustained use for long periods of time.

Recent commercial and institutional techniques for roasting foods, such as omelets, call for the frying under pressure of egg liquid combined with seasoning and vegetables. This is accomplished by placing egg liquid in a frying device, frying it and placing a weight on top of the omelet after it has sufficiently solidified.

2. Description of the Prior Art

A. Prior Art Of Others

Conventional frying devices present problems solved by my invention in utilizing prior apparatus and methods for several reasons.

It is known that when foods are fried in a pan without a cooking oil or similar substance, the food will stick to the frying surface.

In the prior art, such sticking may in some cases be prevented by coating the pan with Polytetrafluroethylene (Teflon). Teflon is a trademark of DuPont. However, after continued and intensive use, the Teflon coating will fade and wear out. In intermittent and continuous commercial mass-production use of Teflon-coated roasting pans, the pans wear out in about three months. Additionally, frying devices known to me have not been provided with means to permit the escape of cooking gases while frying directly from the material being fried to the atmosphere. Thus, when foods are fried under pressure, cooking gases may build up and create a safety hazard.

Additionally, although many frying pans are made of iron, iron is extremely heavy and has extremely high thermoconductivity. Finally, any non-Teflon pan requires the reapplication of considerable amounts of surface oils.

A commercial process for producing a folded egg omelet is disclosed in U.S. Pat. No. 3,753,737 to Latham et al. But that process only discloses a folded, and not a layered, omelet; it discloses an omelet pan of stainless steel and teaches no special means for venting cooking gases other than stopping the process (Col. 7, lines 33 ff.) and exposing the entire pan to the air during frying. Further, this process cannot produce an evenly compressed cooked omelet since there is no teaching of a weight used during cooking. Finally, no special appearance or method is disclosed to prevent the sticking of the omelet during the cooking process.

U.S. Pat. No. 3,732,114 to Field teaches a method of producing a laminated frozen food product. Field uses a thin film of heattransfer lubricant to remove heat from the food product and freeze it. Field has nothing to do with cooking and does not discuss or solve the problem of food being fried sticking to any cooking device due to the thermoconductivity of the frying device or discuss or solve the problem of venting the omelet during frying.

The prior art also discloses several devices that can be utilized as frying devices. U.S. Pat. Nos. 993,169 to Hudson, 1,010,887 to French, 1,072,892 to Wilson, and 1,292,476 to Kavanagh, for example, all show hinged frying pans suitable for making omelets, but none of these patents teach, show or suggest any structure or method for preventing sticking of the food being fried, or lowering thermoconductivity, or venting of the gases produced, while cooking. These two goals must be achieved in any device used in the institutional and commercial mass production of fried foods such as omelets. A device similar to those shown in the aforementioned patents is U.S. Pat. No. 2,696,161 to Hicks for cooking wieners in waffle dough.

A device that does disclose some structure for venting cooking gases is disclosed in U.S. Pat. No. 1,874,836 to Trenner et al. Trenner relates to baking of pies and pie shells, not frying, but the vents shown in the device disclosed are to allow condensible vapors to escape. Importantly, the vents disclosed do not vent directly from the product being cooked to the atmosphere, but to the bakery oven and, importantly, the interior vent surfaces do not directly contact the material being cooked. Further, Trenner discloses no structure or method to prevent sticking or lower thermoconductivity.

U.S. Pat. No. 2,174,425 to Schlumbohm disclose a very thin metal foil fry pan that is designed to be used only once and then thrown away and disposed of. It is not to be reused. Schlumbohm attributes any improved nonsticking qualities of his device to the highly polished surface. Importantly, the recesses and grooves disclosed do not serve as vents (they are to be filled with fat, see Col. 2, line 43 ff.) and are places where food being fried could stick. Thermoconductivity is high. Any vents disclosed are from the outer of a set of walls.

U.S. Pat. No. 3,007,595 to Remley describes a multiple-recess cooking utensil having two complementary pan members joined by a hinge structure. The pores, although described as preferably of uniform cast construction, are not described as including pores and cavities. Further, the pans are not described as being cast of a low pressure of an aluminum alloy so as to form the desired cavities or pores.

U.S. Pat. No. 2,618,258 to Kroyer relates to cooking utensils having a frying surface provided with a multitude of rounded depressions with rounded tops therebetween. The frying surface as a whole has an undulated, dimply or rippled appearance substantially similar to that of hammered silverware (note column 2, lines 10–13). The depressions are described as having a diameter of about $\frac{1}{8}$–$\frac{3}{8}$ inch (column 3, lines 14–15), well outside the range of my invention. Further, the arrangement of Kroyer is described as reducing the danger of scorching the food being fried and thus cannot properly be considered a teaching of providing much smaller cavities or pores to prevent sticking of food being cooked.

Kroyer also describes (column 3) producing his utensil of aluminum and forming a coating of reduced heat conductivity by anodically oxidizing the aluminum to form a rippled surface with dimensions of a quite different order of my invention. My invention defines the fry member as cast under low pressure from aluminum alloy of a certain type to form the porous frying surface.

U.S. Pat. No. 1,216,973 to Epprecht describes a frying pan having a bottom provided with a plurality of closely arranged, minute depressions serving as wells for fat to prevent scorching of food being fried. The depressions may be formed by stamping or by casting, but Epprecht does not describe casting the pan under low pressure and from an aluminum alloy.

U.S. Pat. No. 264,867 to Ege describes a broiler formed of two hinged plates having embossments to afford sufficient intermediate spaces for the retention of the juices of the meats or other substances placed thereon. The material used in he manufacture of the plates is preferably sheet metal and the embossments are not described as being within the size range of my invention or produced from casting an aluminum alloy of low pressure.

B. Prior Art Of Mine

Other prior art includes my British Patent Specification No. 1 511 407, Canadian Pat. No. 1069324, Brazilian Pat. No. 7605736, French Certificat D'Utilite No. 76 26497, German Pat. No. 26 41 20 and Japanese Application No. 46,785/1976.

While this prior art generally describes a porous material composed of aluminum or a metallic compound or a ceramic, there is no teaching or suggestion in any of that prior art of what I have found to be true in the apparatus of this invention, namely the use of aluminum alloy with specific ranges of certain component or the casting formed under a low pressure of 1 (one) atmosphere as described hereinafter and the formation of pores and cavities in the casting of a defined size range.

For example, in my Canadian Pat. No. 1069324 it is stated that there is no limitation in the "size . . . of the holes or slits in the side walls of the pan elements (page 4, lines 30–31)." This refers to the body of the frying device. In fact, in all of my prior art patents, all dimensions stressed and defined are the dimensions of the holes in the specific form of the invention using a weight number and are dimensions for the holes in the weight member, not in the walls or bottom of the fry member, (see, e.g., British Pat. No. 1,511,407, p. 2, lines 48'50; Canadian Pat. No. 1069324, p. 3, line 19).

SUMMARY OF THE INVENTION

It has now been discovered that when the roasting device is made from a particular aluminum alloy cast at a certain pressure so as to produce a porous frying member also having surface cavities, and the resulting pores and cavities are filled with an appropriate oil, foods such as egg liquid can be fried without sticking to the frying surface and the frying device will have an extremely long life under heavy commercial use.

A metal alloy that is especially adapted after die cast to produce a porous frying device with surface cavities is composed of 2.7–4.5% magnesium and smaller amounts of copper, silicon, zinc, manganese, iron and titanium; the remainder (more than 92%) is aluminum and tiny traces (0.05 each) of other three other substances. When such a metal is cast at a specified low pressure, for example, one (1) atmosphere, a porous frying member with surface cavities is produced. The manufacturing process for this casting is to be distinguished from high pressure casting where the resulting porosity would not be sufficient. As distinguished from the short life of the Teflon-coated frying device described above, the frying devices of this invention have, so far as is now known, a commercial use promising permanent operation. This alloy further produces a device with excellent anti-corrosive properties, resists defacement and has great mechanical strength.

The resulting pores formed within the metal and the cavities on the surface of the frying members vary from a minimum of 0.01 mm. to a maximum of 0.4 mm. in maximum open-space "diameter" dimensions. The pores of the frying members are then filled with an oil, such as an edible oil such as a vegetable oil, for prolonged storage. Before cooking use, a small amount of an edible oil is placed on the surface of the fry device. The means for filling the pores with oil can be either simple immersion combined with a heating means, or utilization of a vacuum means that results in oil being forced into the pores, or any other means that can completely fill the fine pores in the porous members. Once the pores are filled with oil, the thermal conductivity of the frying member is considerably lowered. This lowered thermal conductivity allows a food such as egg liquid to be fried with a minimum amount of oil placed on the cooking surface of the member and without any sticking of the food to the cooking surface.

The amount of surface oil needed to be added is approximately only 50% of the surface oil that is added in prior art devices.

In addition to the ability to be made porous, the aluminum alloy described above does not leave residue in the food, the surfaces of the device do not corrode or mar easily and they are light. Also, this alloy can produce thick-bottomed frying devices, which increases the reduced thermal conductivity effect of the absorbed oil, and thus further reduces the sticking problem.

It has been further found that to provide a plurality of vent holes or grooves along the sides of the frying device allows cooking gases to escape to the atmosphere and thus produce a tightly and compactly fried food product or, for example, a multilayered omelet. These vent holes or grooves along the sides of the device are very important when a tightly and compactly fried multilayered food product is desired. In order to produce such a product, the cooking food, such as egg liquid, must be compressed by a weight member. Whether the weight member has vent holes in it or not, cooking gases will develop in the underlying layers and the vent holes or grooves along the sides of the frying device formed of the aluminum alloy permit a safe escape of the cooling gas. Without venting in some manner, the cooking gases in the underlying layers could not escape and thus produce both an undesirable gas-filled food product and a potentially dangerous situation for the operator of the frying device.

The frying device can be used with conventional types of commercial food preparation equipment. All that is needed is a means of supplying raw food, such as egg liquid, and a means of supplying heat to the roasting device, such as a natural gas flame.

BRIEF DESCRIPTION OF THE DRAWINGS

The following is a brief description of the drawings:

FIG. 1 shows a top view of the preferred embodiment of the frying device of the present invention;

FIG. 2 is an enlarged partial side sectional view of the frying device of FIG. 1;

FIG. 3 is an enlarged partial side sectional view of the frying device of FIG. 1 containing fried egg liquid;

FIG. 4 is a perspective view of one embodiment of a weight member that may be utilized;

FIG. 5 is a partial side sectional view of another venting structure embodiment of the frying device of FIG. 1;

FIG. 6 is a partial side sectional view showing a four-layered omelet with a weight member placed on top;

FIG. 7 is a partial side sectional view of a frying device similar to that of FIG. 3 containing fried egg liquid;

FIG. 8 is a side view of a rotary table used to support the frying device of FIG. 1 and to carry out the method of frying the food, for example, an omelet.

DESCRIPTION OF THE PREFERRED EMBODIMENT

Referring now to FIG. 1, the preferred embodiment of the frying device is shown. The frying device 1 is composed of a pair of frying members 2, 3 connected by a hinge 22. The frying members are made from the specified aluminum alloy described above, preferably die cast under low pressure of about one (1) atmosphere. As described above, the frying members are provided with a plurality of interior pores and surface cavities 4 (shown as greatly enlarged for clarity of illustration) which vary between a minimum of 0.01 mm. and a maximum of 0.4 mm. in open dimension. Also, the pores are so situated in the fry member so as to enable these pores to be completely filled with oil.

The pores may be filled with oil by first attaching each of the frying members 2, 3 to a vacuum pump. This can be accomplished by means of an attachment provided with a cavity into which the bottom of the frying members 2, 3 can be received. A tube is connected from the cavity to the vacuum pump. The mounted frying members 2, 3 are then placed in an oil bath and the vacuum pump is turned on. The suction developed by the vacuum pump causes the oil to seep into the metal and fill the pores throughout the members. The frying members can also be filled with oil by immersion in a bath of oil or by filling the members over heat.

A small surface oil layer is formed on the bottom of the frying device as at 14 by pouring oil onto the frying surface of the frying members 2, 3 before frying the egg liquid or other food. However, as stated above, the amount of oil needed is far less (approximately 50%) than that in conventional devices.

Heat is provided by placing the frying device 1 over a gas fire, for example from natural gas, in a rotary table with a plurality of gas heaters as shown in FIG. 8. The oil-filled pores will lower the thermoconductivity of the metal frying members 2, 3. Moreover, the cavities will give the frying surface of each frying member 2, 3 a coarse and slightly rough configuration. As a result, the egg liquid or other food can be fried without the food coming into full physical contact with the metal frying surface, since a portion of the food will be separated from the frying surface by the cavities filled with oil. The very thin oil layer in the frying pan will further insulate the frying food from the frying surface, and will preclude any possibility of sticking.

Referring now to FIGS. 3 and 7 the side walls 10 of each of the frying members 2, 3 may be provided with linear rows of holes 12, 13 which penetrate the inner surface of the side walls 10 to form vents 11. As can be seen in FIG. 3, the lowermost vents 11 are positioned near the middle portion of the side wall 10 at a position above the first layer 14 of egg liquid so that when the first layer of egg liquid 14 is poured into the frying members 2, 3 it will not seep out through the vents 11. Grooves 11b are illustrated in FIGS. 3 and 7.

Frying member 2 is provided with a handle 18 and frying member 3 is provided with a handle 19. This enables each frying member 2, 3 to be rotatable about the hinge 22 in the direction indicated by the letter A in FIG. 1.

A weight member 16, whose length and width are each 0.1 cm. less than the corresponding dimensions of the inner portions of the frying members 2, 3 is provided with a plurality of holes 17. The weight member 16, which may have a handle, is placed over the frying egg liquid as shown in FIG. 6 to provide pressure. The weight of the weight member is equal to or somewhat greater than that of the weight of the product being fried, for example, a weight member of 500 g.-1 kg. is suitable for a product weighing 500 kg. Alternatively, the weight member 16 can be made without vents 17, in which case the cooking gases would leave only through the vents 11b. The number of vents 11b can be changed to suit the type of food fried, and the weight can be changed to alter compactness of looseness desired in the finished product.

In the method of the present invention, a plurality of frying devices are positioned on an indexed rotary table 23, supported by a base, as can be seen in FIG. 8. The rotary table 23 is provided with a plurality of conventional gas burners 23a (details not shown) underneath the frying devices 1, as a source of heat. The egg liquid is discharged by a filler tube or tubes 25 supported by a bracket into each frying member from supply container 26 which is connected by conduits to a pressure pump and timer. The filler tubes are reciprocated by any conventional means to evenly place layers of liquid egg in the frying devices synchronized with movement of the rotary table. The indexed rotary table should be rotatable so that each frying device can be positioned under tube or tubes in sequence in a timed manner. Each frying device is indexed or rotated under tube or tubes the number of times necessary for the number of layers desired.

The tube or tubes will deposit a first and second layer of egg liquid in respective fry members. Those layers in roast members are hardened and then a frying member is rotated by its handle so that the hardened egg liquid or omelet therein is turned over and transferred to another frying member to form a two-layered omelet. Cooking gases which may accumulate can escape through the first set of holes 13.

Egg liquid is now supplied to the frying member to form the third layer. After this has hardened, the two-layered omelet in the frying member is again rotated with a handle to form a three-layered omelet. Cooking gases can now escape through both sets of holes 12 and 13.

The process is repeated by pouring egg liquid into a frying member and transferring the three-layered omelet in frying member to another frying member after the egg liquid has hardened to form a four-layered omelet.

As can be seen in FIG. 6, the weight member 58 is then placed over the four-layered omelet to pressure cook all four layers. Cooking gases escape through holes 12 and 13 and holes 17. Referring further to FIG. 5, the side wall 10 of frying member can be configured to contain slits 11 in place of the two linear sets of holes to expel cooking gases.

What is claimed is:

1. A frying device, comprising a metallic frying member cast under low pressure of approximately one atmosphere from an aluminum alloy to form a porous frying surface containing pores and surface cavities adapted to be filled with oil, said aluminum alloy including more than 92% aluminum and approximately 2.7% to 4.5% magnesium, said cavities and pores being in the range of 0.01 millimeter to 0.4 millimeter in diameter, said member further provided with venting orifices penetrating the side walls of the frying member and when filled with oil having a low thermal conductivity and being adapted to preventing sticking of foods being fried therein.

2. The frying device of claim 1, further provided with a removable weight member adapted to be placed on top of the frying food.

* * * * *